United States Patent
Zimmer et al.

(10) Patent No.: US 8,356,168 B2
(45) Date of Patent: Jan. 15, 2013

(54) NON-BLOCKING UEFI I/O CHANNEL ENHANCEMENTS

(75) Inventors: Vincent J. Zimmer, Federal Way, WA (US); Michael A. Rothman, Puyallup, WA (US); Mark S. Doran, Olympia, WA (US)

(73) Assignee: Intel Corporation, Santa Clara, CA (US)

(*) Notice: Subject to any disclaimer, the term of this patent is extended or adjusted under 35 U.S.C. 154(b) by 1095 days.

(21) Appl. No.: 12/142,086

(22) Filed: Jun. 19, 2008

(65) Prior Publication Data
US 2009/0319763 A1  Dec. 24, 2009

(51) Int. Cl.
*G06F 9/00* (2006.01)
(52) U.S. Cl. ............................. 713/2; 719/327
(58) Field of Classification Search ....... 713/2; 719/327
See application file for complete search history.

(56) References Cited

U.S. PATENT DOCUMENTS

| | | | | |
|---|---|---|---|---|
| 7,310,724 | B2* | 12/2007 | Chen et al. | 713/1 |
| 7,568,090 | B2* | 7/2009 | Morrison et al. | 713/2 |
| 7,925,876 | B2* | 4/2011 | Lee et al. | 713/2 |
| 2008/0005372 | A1* | 1/2008 | Bolen et al. | 710/8 |

OTHER PUBLICATIONS

Unified EFI, Inc., Unified Extensible Firmware Interface Specification, Version 2.0, Jan. 31, 2006.*

* cited by examiner

*Primary Examiner* — Albert Wang
(74) *Attorney, Agent, or Firm* — Blakely, Sokoloff, Taylor & Zafman LLP

(57) ABSTRACT

A method and apparatus for providing platform initialization enhancements is discussed herein. In one embodiment, buses, activities, devices, and/or nodes to be processed during boot, are processed in a non-blocking fashion, which potentially results in faster boot times. Moreover, some devices/nodes, such as root nodes, may be boot in an early phase of initialization to enhance both available resources and initialization times. Furthermore, early connects in an early phase of initialization may be performed to construct partial or entire device paths, which also potentially results in faster boot times.

22 Claims, 4 Drawing Sheets

NON-BLOCKING UEFI I/O CHANNEL ENHANCEMENTS

FIELD

This invention relates to the field of computer systems and, in particular, to system initialization enhancements.

BACKGROUND

Advances in semi-conductor processing and logic design have permitted an increase in the amount of logic that may be present on integrated circuit devices and in computer systems. However, as systems have become larger and more complex, the time to initialize the system, i.e. a time to boot a system, has drastically increased. Often a competitive feature of a platform, from a user's perspective, is the time from power-on or reset to a usable Operating System prompt.

Currently, legacy Basic Input/Output Software (BIOS) performs device initialization upon boot in a serial fashion. For example, when initializing a USB device and an IDE device, the USB root hub, a USB bus, a USB switch, the USB device, the IDE root hub, the IDE bus, and the IDE device are processed or initialized serially. Note that these individual devices or nodes may previously been interleaved during initialization, but not overlapping, i.e. not in parallel or in a non-blocking manner. Even with the advent of more robust initialization environments, such as Extensible Firmware Interface (EFI) environments, these devices are still processed in a blocking fashion.

Furthermore, within an EFI environment, path abstractions representing paths to hardware devices or file locations are often not created until a later initialization phase of the boot sequence, such as a Driver Execution Environment (DXE) phase. As a result, building paths and processing devices in a serial fashion in later phases of a boot sequence potentially results in inefficient platform initialization. This potentially increases the amount of time from power-on or reset to a usable OS prompt for the user.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific hardware devices, specific types of device paths, specific initialization firmware interface environments, specific phases of initialization, etc. in order to provide a thorough understanding of the present invention. It will be apparent, however, to one skilled in the art that these specific details need not be employed to practice the present invention. In other instances, well known components or methods, such as specific Extensible Firmware Interface features, code and implementation, as well as other specific operational details, have not been described in order to avoid unnecessarily obscuring the present invention.

The method and apparatus described herein are for enhancements to perform efficient system initialization. Specifically, non-blocking channel enhancements, as well as other initialization enhancements, are primarily discussed in reference to a Unified Extensible Firmware Interface (UEFI) environment. However, the methods and apparatus for efficient system initialization are not so limited, as they may be implemented in or associated with any initialization environment, such as with a legacy Basic Input/Output Software (BIOS) environment.

Figure 1:
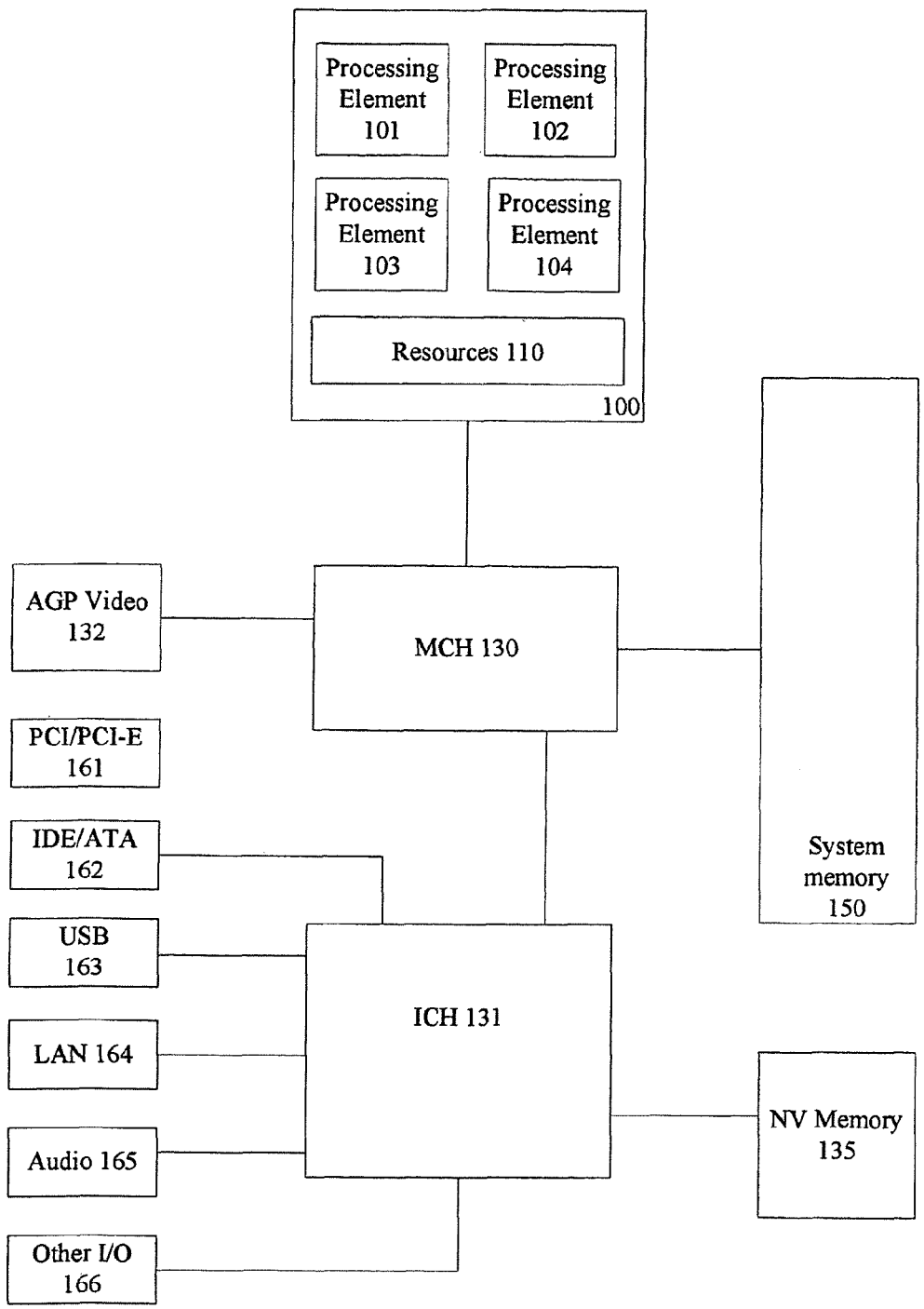
FIG. 1 illustrates an embodiment of a system capable of being efficiently initialized utilizing non-blocking channel enhancements.

Referring to FIG. 1, an embodiment of a system capable of being efficiently initialized is illustrated. Processor 100 includes any processor, such as a host processor, a microprocessor, an embedded processor, a digital signal processor (DSP), a network processor, or other device to execute code. Although, only processor 100 is illustrated in the system, the system may include any number of processors. As illustrated, processor 100 includes four processing elements 101-104; however, any number of processing elements may be included in processor 100.

A processing element refers to a thread unit, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. As an example, a physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread, which may also be referred to as a physical thread, typically refers to any logic located on an integrated circuit capable of maintaining an independent architectural state, wherein the independently maintained architectural states share access to execution resources. Therefore, as can be seen, multiple software threads, such as multiple replications of a single-threaded application, in one embodiment, are capable of being executed in parallel on multiple processing elements, which may include a combination of any of the aforementioned processing elements, such as cores or hardware threads.

Also illustrated in processor 100 are resources 110, which typically include registers, units, logic, firmware, memory, and other resources to execute code. As stated above, some of resources 110 may be partially or fully dedicated to processing elements, while others are shared among processing elements. For example, smaller resources, such as instruction pointers and renaming logic may be replicated for physical threads. Some resources, such as re-order buffers in a reorder/retirement unit, instruction lookaside translation buffer (ILTB), load/store buffers, and queues may be shared through partitioning. Other resources, such as general purpose internal registers, page-table base registers, low-level data-cache, a data-TLB, execution unit(s), and an out-of-order unit are potentially fully shared among threads. In contrast, cores may have dedicated execution resources, while sharing at least a portion of a higher level cache, such as a second level cache (L2).

In one embodiment, resources 110 include a processor pipeline, which may include any number of pipeline stages. Common examples of pipeline stages include an instruction pointer stage, a fetch stage, a decode stage, a drive stages, and allocate stage, a renaming stage, a queue stage, a reorder stage, a schedule stage, a dispatch stage, an execution stage, a memory access stage, and a register access stage. Note this list of stages includes an exemplary non-exhaustive list of processor pipeline stages, as any known pipeline stages may be included in processor 100.

Processor 100, as illustrated, is coupled to system memory 150 through Memory Controller Hub (MCH) 130. System memory 150 is often a volatile memory to be shared by system devices. Common examples of system memory 150 include a Random Access Device (RAM), Static RAM (SRAM), Dynamic RAM (DRAM), Double Data Rate (DDR) RAM, as well numerous other commonly known system memory devices. As illustrated, an Advance Graphics Port (AGP) device is also coupled to MCH 130. Often, an AGP device includes a video device, such as a graphics processor and/or accelerator. Alternatively, video device 132 includes a Peripheral Component Interconnect Express (PCI-E) video device or other video device. Note, that a separate video device is not necessary, as video computations may be performed by processor 100 or integrated in MCH 130 and/or ICH 131.

Furthermore, Interconnect Controller Hub (ICH) 131 is coupled to MCH 130. Often, the combination of MCH 130 and ICH 131 is referred to as a chipset. As depicted, non-volatile (NV) memory 135 is also coupled to ICH 131. In one embodiment, NV memory 135 includes a flash device, or other non-volatile memory device, to hold Basic Input/Output Software (BIOS) code. BIOS code may include traditional legacy BIOS code, Extensible Firmware Interface (EFI) code, or other system initialization code. Note that BIOS code, such as EFI code, not only provides an initialization platform, but also often provides an interface for software to the system's firmware during runtime. Often, this initialization code is executed by processor 100 during boot to initialize the platform including interconnects, as well as devices coupled thereto.

Any number and style of interconnects may be present in a computer system. As depicted, the system includes the following interconnects: PCI/PCI-E 161, Integrated Device Electronics (IDE), Advanced Technology Attachment (ATA) 162, Universal Serial Bus (USB) 163, Local Area Network (LAN) 164, Audio 165, and other I/O 166 interconnects. However, any known physical or wireless interconnect may be included in or supported within the system. Furthermore, any combination of devices may be coupled to these interconnects.

Common examples of hardware devices to be coupled in a computer platform include an interconnect device, a Universal Serial Bus (USB) device, a Common System Interface (CSI) device, a graphics device, an Advanced Graphics Port (AGP) device, a Peripheral Component Interconnect (PCI) device, a PCI Express (PCIE) device, a storage device, Advanced Technology Attachment (ATA) device, and a Serial Advanced Technology Attachment (SATA) device, a video device, a storage device, an audio device, a network device, and other media or I/O devices.

The illustrated system is capable of being efficiently initialized, whether after a cold start or upon a reset event. In one embodiment, early connects for paths to represent targets, such as hardware devices, boot files, or other target related information in the system, are performed. In another embodiment, nodes of a path are processed during an early initialization phase, when limited resources are available to the system. In yet another embodiment, nodes of paths for different targets are processed in a non-blocking manner, i.e. at least partially in parallel and/or concurrently. Note that any of the aforementioned embodiments, or any combination thereof, may be utilized to efficiently boot a computer system.

In one embodiment, the platform includes an Extensible Firmware Interface (EFI) environment, which may also be referred to as an interface or framework, to initialize the system and provide an interface between software and system firmware. The interface is often in the form of data tables that contain platform-related information, as well as boot and runtime service classes that are available to an Operating System (OS) loader and the OS. Together, this information and these services provided a standardized environment for booting to an OS. EFI may include any number of components, such as a boot manager to allow loading of EFI applications or EFI drivers from fields on an EFI defined file system or a defined image loading service, EFI images to include files defined by EFI that contain executable code, EFI applications including EFI executable code to be loaded by an EFI boot manager or other EFI applications, an EFI OS loader to take over control of the system from EFI firmware, and EFI drivers to be available at boot and/or runtime to provide services to access firmware. Other information regarding EFI implementation may be found from the current Unified EFI specification at wwwu.uefi.org.

Figure 2:
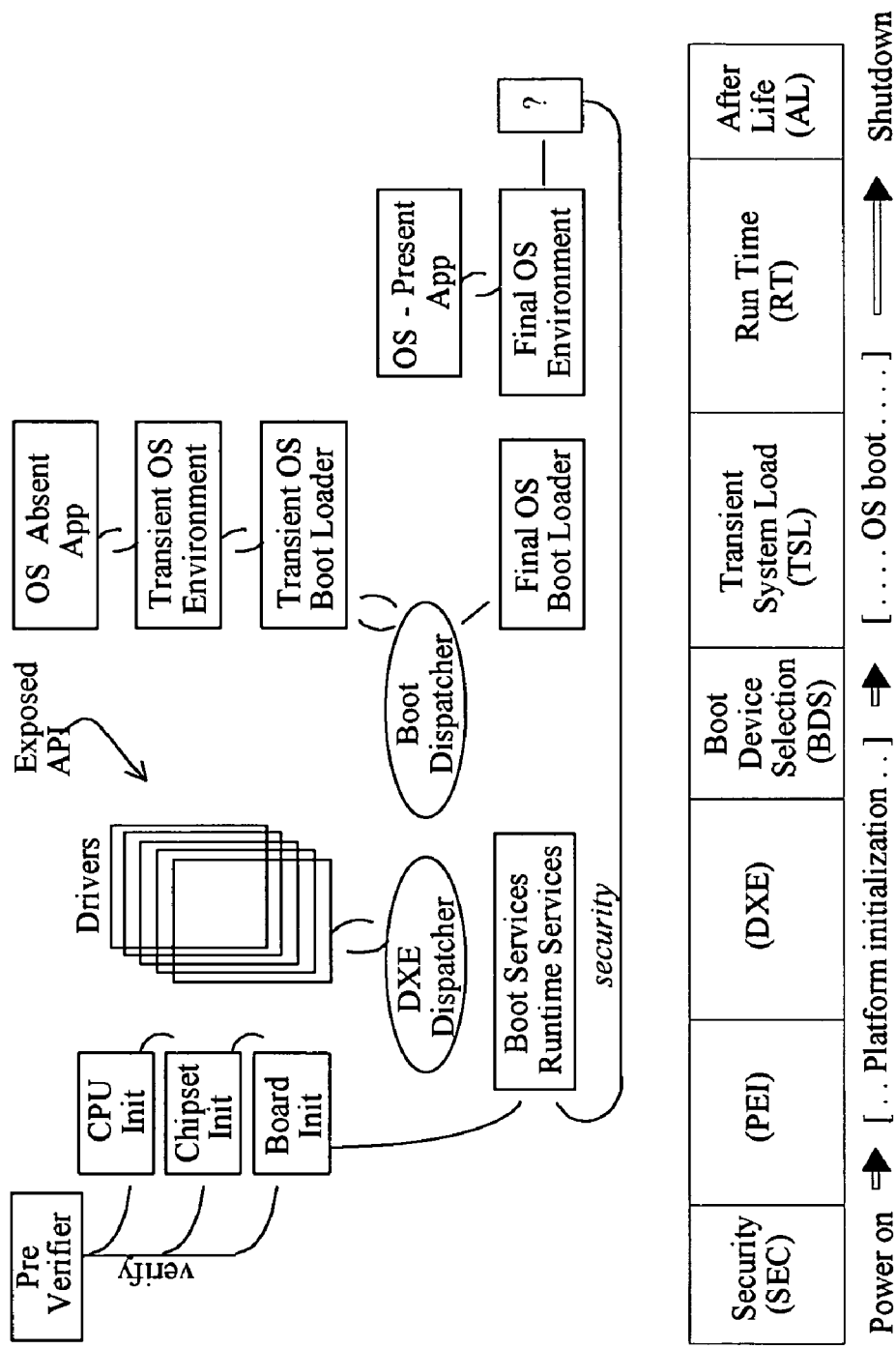
FIG. 2 illustrates an embodiment of initializing a platform within an Extensible Firmware Interface (EFI) environment.

Turning to FIG. 2, an embodiment of a flow for an Extensible Firmware Interface (EFI) environment, which may also be referred to herein as a framework, is illustrated. Often an EFI environment supports initialization of a system and provides services to an OS via a series of phases, such that each phase is characterized by the resources that are available, rules that code being executed in each phase is to follow, and/or the results obtained in each phase. Here, the infrastructure available in each phase is provided by the central framework, while platform specific features are implemented using intercommunicating modules.

Note from FIG. 2 that platform initialization primarily occurs over two phases within the framework: a pre-EFI (PEI) phase and a Driver Execution Environment (DXE) phase. Previously, in the PEI phase, a PEI module configures the platform with minimum resources to enable the DXE phase. For example, during a PEI phase, a smaller subset of system memory is initialized to provide basic resources for preparing the platform for entry into the DXE phase. Moreover, in the DXE phase, DXE services are provided to configure the platform into a final pre-boot state.

In one embodiment, device paths are built or constructed during a first phase of initialization, such as during the PEI phase of initialization, which herein may be referred to as an early connect. A device path is often used to define a programmatic path to a device or file. For example, a device path is to allow an application, such as an OS loader, to determine the physical device that the EFI interfaces are abstracting.

Note, as described below, a path, in one embodiment, includes a full programmatic path to a device with an endpoint node terminating the entire path. In another embodiment, a path refers to a subset of an entire path with an endpoint that terminates the current instance, but does not terminate an entire path. In one embodiment, a device path is also utilized to define a location on a medium where a file should be, or where a file was loaded from. Furthermore, a special case of a device path can also be utilized to support the optional booting of legacy OS' from legacy media. As an example, when a network connection is being utilized as a boot device and console, a device path for a network adapter will convey the network adapter and protocols being utilized as the console and boot device. As a result, a boot target, in one embodiment, refers to a device, a location on a device, a special device path, any other known target of a programmatic path, or any combination thereof.

A collection of device paths is typically referred to as a name space. As an example, Advanced Configuration and Power Interface (ACPI) often utilizes an ACPI Source Language (ASL) to define name spaces. However, these name spaces are typically utilized during runtime. As a result, use of path within an EFI framework is often analogous to a name space as referred to in regards to the ACPI. In fact, with EFI usually a device path includes a structure to define a linkage for the device path back to an ACPI namespace. In other instances ACPI defers to buses to fill in gaps in namespaces. Here, a device path is able to relate gap information utilizing standard enumeration mechanisms. Therefore, in one embodiment, reference to a path or device path also indirectly refers to an ACPI namespace, or a portion thereof.

In one embodiment, a device path is a structure made up of device path nodes. As a specific illustrative example, a device path for EFI includes a variable-length binary structure made up of variable-length generic device path nodes. As defined in the UEFI specification noted above, there are six major types of device path nodes: a hardware device path to define how a device is attached to the resource domain of a system, an ACPI device path to describe devices whose enumeration is not described in an industry-standard fashion, a messaging device path to describe the connection of devices outside the resource domain of the system, a media device path to describe the portion of a medium that is being abstracted by a boot service, a BIOS boot specification device path to point to boot legacy operating systems, and an end of hardware device path to indicate a end of a device path instance or an entire device path structure.

Figure 3:
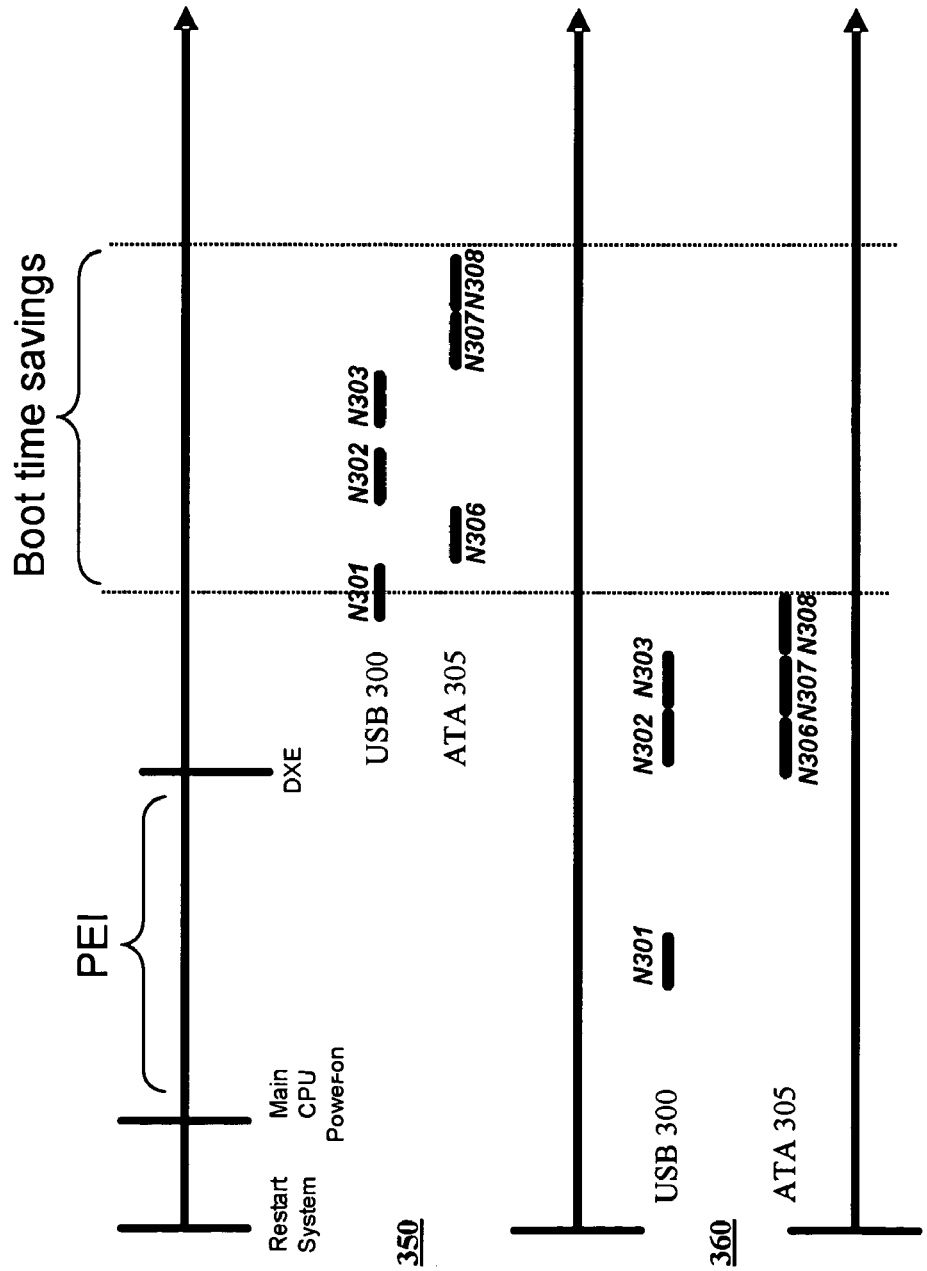
FIG. 3 illustrates an embodiment of potential boot savings through parallel device initialization/processing.

Referring to FIG. 3, an embodiment of boot time savings for efficient boot of a system is illustrated. As an extremely oversimplified example, a first boot target, such as USB device 300, is represented by a boot path indicating the following nodes: USB0 (N301)\DISK1 (N302)\Winload.efi (N303) and a second boot target, such as a Serial ATA device 305, is represented by a boot path indicating the following nodes: SATA1 (N306)\PART1 (N307)\linuxloader.efi (N308).

In one embodiment, some of the nodes or devices to be initialized in a platform are initialized, processed, and/or connected during a first initialization phase, such as a PEI phase of an EFI initialization. For example, a root device path node, such as N301, i.e. a USB root hub, is started-up or connected during the PEI phase, instead of starting-up or connecting the root device during the DXE phase. As a result, other connection tasks may be performed earlier in the DXE phase, which potentially saves time in the boot process.

Additionally, in one embodiment, processing or starting-up of nodes are performed in a non-blocking manner. In other words, at least some nodes of a path are processed or initialized in parallel with other nodes of a potentially different path. For example, a previous blocking initialization 350 of USB device 300 and ATA device 305 are performed in a serial fashion. Here, note that processing of nodes 301-303 and 306-308 are interleaved but do not overlapped at any time, as each node is processed serially. However, in contrast, in initialization flow 360, processing of nodes 302-303 are performed at least partially in parallel with processing of nodes 306-308, i.e. node 302 is processed in parallel or at the same time as node 302 while node 303 is processed in parallel to node 307. Note that the early processing of node 301 in the PEI phase and the overlapping, i.e. non-blocking, processing of nodes 302-303 and 306-308 result in a drastic boot time savings, as illustrated, in regards to the serial blocking processing of initialization flow 350.

Examples of time-critical initialization actions that potentially are overlapped, i.e. processed in a non-blocking fashion, or started/processed early in an early phase of initialization include: an IDE bus, a BIOS keyboard, a BIOS video, a graphics console, a con splitter, a USB bus, and any of the other aforementioned devices, boot targets, and/or boot services. However, any devices, nodes, or services may be processed in an early phase of initialization or processed in a non-blocking fashion.

Figure 4:
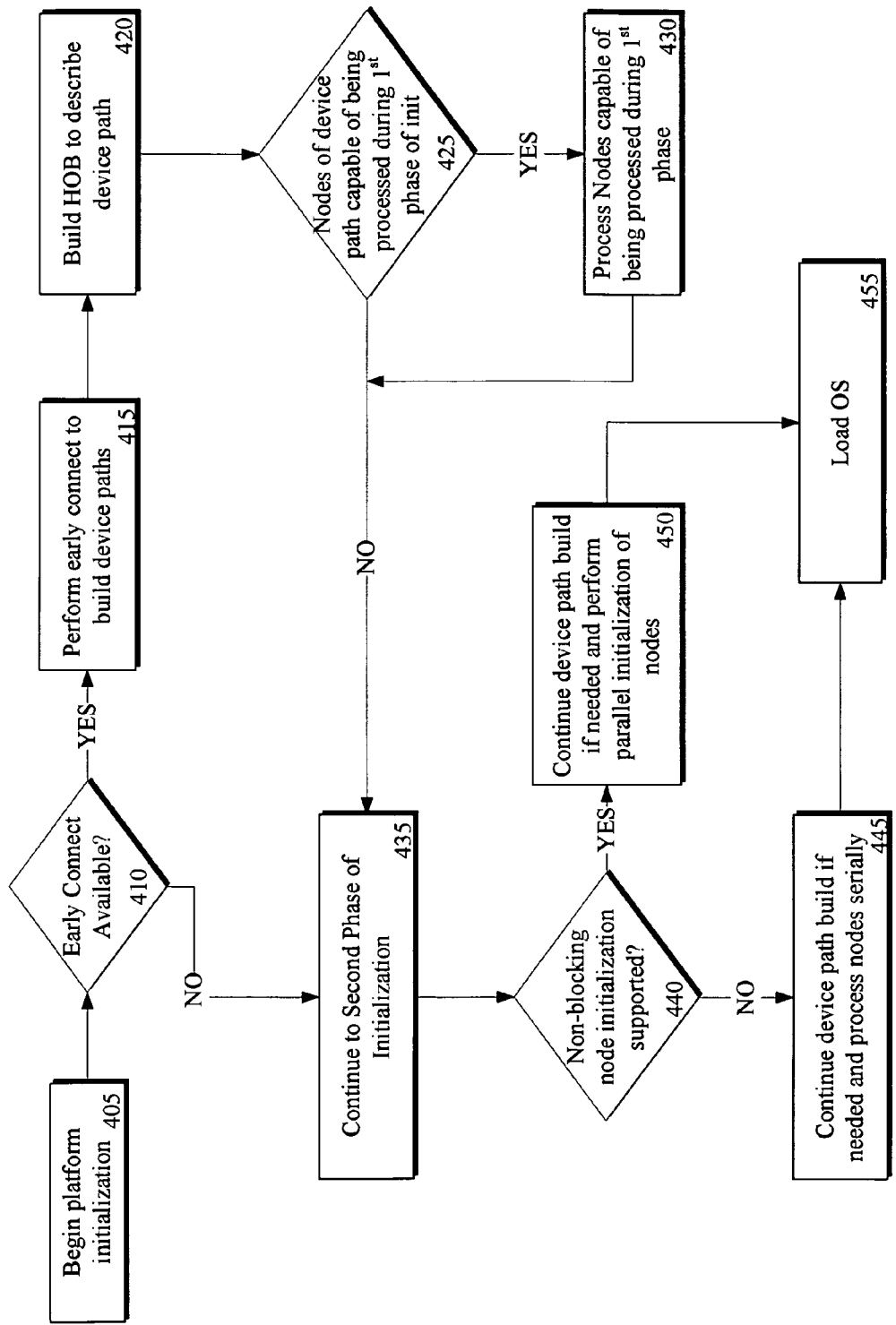
FIG. 4 illustrates an embodiment of a flow chart for a method of providing non-blocking channel enhancements for efficiently booting a system.

Referring next to FIG. 4, an embodiment of a flowchart for a method of efficient initialization of a system is illustrated. The blocks of FIG. 4 are illustrated in a substantially serial fashion. However, these blocks may be performed in parallel, as well as in a different order. In block 405, platform initialization is started. Note that platform initialization may be started in response to a cold start of a computer system or upon a reset of the system. Normal Power on Self Test (POST) and security verification procedures are performed. During a first phase of initialization, in flow 410, it is determined if an early connect for device paths are available. In one embodiment, determining if an early connect for a device is available includes performing the early connect in response to code being present to support an early connect. In another embodiment, early connect is enabled or disable by system and/or user policies.

If early connect is available, then an early connect to build/construct a path for a boot target or device is performed in flow 415. As an example, a portion of a device path, such as a path terminated by an end of instance node, is constructed during a PEI phase of initialization. As another example, a full or entire path is constructed during the PEI phase of initialization. In one embodiment, a structure to hold a representation of a device path, which may be utilized for processing in later initialization phases, is referred to as a Hand-Off Block (HOB). In block 420, a HOB is constructed to describe and/or include a representation of a device path.

In decision block 425, it is determined if nodes of a device path are capable of being processed during the first phase of initialization. In one embodiment, similar to the discussion above, code held in the platform is to be executed during a PEI phase to initialize nodes. As another example, determining whether devices are capable of being processed during an early phase of initialization is based on any number of factors, such as early node processing being enabled/disabled, a type of device/node to be processed, a number of nodes in the path or system to be initialized, and resources available to initialize the node.

In block 430, nodes capable of being processed/started up during the early phase are processed. For example, a root node, such as a host controller for a bus, is started in the early phase. Note, in one embodiment, non-blocking initialization of multiple early start nodes may be performed in the early phase of initialization.

Whether after determining early connect is not available, determining nodes are not capable of being processed in an early phase, and/or after performing early initialization of nodes, in block 435, a second phase of initialization is entered. In one embodiment, the first or early phase of initialization includes a PEI phase and the second or late phase of initialization includes a DXE phase, as discussed above.

In block 440, it is determined if non-blocking node initialization is supported. Similar to the discussion above, code potentially exists to initialize nodes at least partially in parallel. Alternatively, the determination may be made based on whether non-blocking initialization is enabled, whether multiple nodes to be processed in parallel are compatible, and/or whether there are enough resources available to perform concurrent initialization. In block 445, if non-blocking initialization is not supported, then any remaining portions of device paths are constructed and any remaining nodes are processed. Alternatively, in block 450, any remaining portions of device paths are constructed, while nodes are potentially processed in parallel, i.e. a non-blocking manner. After initializing the platform, control is often handed over to an OS or an OS loader in block 455.

Therefore, as can be seen from above, enhancements to platform initialization potentially provides for more efficient boot of a computer system. These enhancements may consist of performing early connect in an early phase of initialization, performing early processing of nodes/devices, such as root nodes, in the early phase of initialization, and performing non-blocking node processing/start-up. Each enhancement potentially provides boot time savings, which may be readily visible to a user through a faster time to useful computer function from cold start or restart.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An article of manufacture including program code, stored on a non-transitory computer readable medium, which, when executed by a machine, causes the machine to perform the operations of:
   initializing at least a portion of memory in the machine;
   performing an early connect operation during a pre-initialization phase of the machine to build a path to represent a plurality of path nodes preceding a boot target; and
   initializing the plurality of path nodes during a second initialization phase subsequent to the pre-initialization phase partially in parallel to initializing another plurality of path nodes of another path, wherein the pre-initialization phase includes a Pre Extensible-Firmware-Interface (PEFI) and the second initialization phase includes a Driver Execution Environment (DXE) phase.

2. The article of manufacture of claim 1, further comprising program code, stored on a non-transitory computer readable medium, that when executed by the machine, causes the machine to initialize a root device path node of the plurality of path nodes during the pre-initialization phase of the machine.

3. The article of manufacture of claim 2, wherein the pre-initialization phase of the machine includes a Pre Extensible-Firmware-Interface (PEFI) phase.

4. The article of manufacture of claim 3, wherein the path includes a device path selected from a group consisting of a hardware device path, an ACPI device path, a messaging device path, a media device path, and a BIOS boot specification device path.

5. The article of manufacture of claim 3, wherein the plurality of path nodes include a plurality of device path nodes, and wherein the plurality of device path nodes are selected from a group consisting of a hardware device path node, an ACPI device path node, a messaging device path node, a media device path node, a BIOS boot specification device path node, and an end of hardware device path node.

6. The article of manufacture of claim 1, wherein the boot target includes a hardware device.

7. The article of manufacture of claim 6, wherein the hardware device is selected from a group consisting of an interconnect device, a Universal Serial Bus (USB) device, a Common System Interface (CSI) device, a graphics device, an Advanced Graphics Port (AGP) device, a Peripheral Component Interconnect (PCI) device, a PCI Express (PCIE) device, a storage device, Advanced Technology Attachment (ATA) device, and a Serial Advanced Technology Attachment (SATA) device.

8. The article of manufacture of claim 1, wherein the boot target includes a location of a file to be loaded or a location of a file that has been loaded.

9. An article of manufacture including program code, stored on a non-transitory computer readable medium, which, when executed by a machine, causes the machine to perform the operations of:
 determining a first path for a first device in the machine, wherein the first path includes a first root node of a first plurality of nodes;
 determining a second path for a second device in the machine, wherein the second path includes a second root node of the second plurality of nodes, wherein determining the first path for the first device and determining the second path for the second device is performed at least partially during a pre-initialization phase preceding the initialization phase of the machine, wherein the pre-initialization phase includes a pre-Extensible-Firmware-Interface (PEFI) phase and the initialization phase includes a Driver Execution Environment (DXE) phase; and
 processing a portion of the first plurality of nodes and a portion of the second plurality of nodes at least partially in parallel during an initialization phase of the machine.

10. The article of manufacture of claim 9, wherein the program code, stored on a non-transitory computer readable medium, which, when executed by a machine, causes the machine to further perform the operations of: processing at least the first root node during the pre-initialization phase of the machine.

11. The article of manufacture of claim 9, wherein the first root node includes a first host device associated with the first device, and wherein the second root node includes a second host device associated with the second device.

12. The article of manufacture of claim 9, wherein processing the a portion of the first plurality of nodes and a portion of the second plurality of nodes at least partially in parallel during an initialization phase of the machine comprises initializing the first portion of the first plurality of nodes and the second portion of the second plurality of nodes at least partially in parallel.

13. A system comprising:
 a memory to hold initialization code, wherein the initialization code, when executed, is to,
  in a first phase of initialization, represent a first boot target by a first path including a first plurality of nodes, represent a second boot target by a second path including a second plurality of nodes, and initialize a first root node of the first plurality of nodes, and
  in a second phase of initialization, initialize a remaining number of nodes other than the first root node of the first plurality of nodes and the second plurality of nodes in a non-blocking manner; and
 a processor to execute the initialization code.

14. The system of claim 13, wherein the memory includes a non-volatile memory device, and wherein the initialization code includes Extensible Firmware Interface (EFI) compatible code.

15. The system of claim 14, wherein the first phase of initialization includes a pre-Extensible-Firmware-Interface (PEFI) phase and the second phase of initialization includes a Driver Execution Environment (DXE) phase.

16. The system of claim 13, wherein the first plurality of nodes and second plurality of nodes each include nodes individually selected from a group consisting of a hardware device path node, an ACPI device path node, a messaging device path node, a media device path node, a BIOS boot specification device path node, and an end of hardware device path node.

17. The system of claim 13, wherein the first boot target and the second boot target each include a hardware device, and wherein the first hardware device and the second hardware device are each individually selected from a group of hardware devices consisting of an interconnect device, a Universal Serial Bus (USB) device, a Common System Interface (CSI) device, a graphics device, an Advanced Graphics Port (AGP) device, a Peripheral Component Interconnect (PCI) device, a PCI Express (PCIE) device, a storage device, Advanced Technology Attachment (ATA) device, and a Serial Advanced Technology Attachment (SATA) device.

18. A method comprising:
 during a first phase of initialization,
  determining a path associated with a boot target, the path including a plurality of nodes, and
  creating a hand-off-block to include a representation of the path associated with the boot target; and
 during a second phase of initialization,
  initializing the plurality of nodes included in the path based on the representation of the path included in the hand-off-block concurrently with a second plurality of nodes included in a second path associated with a second boot target.

19. The method of claim 18, wherein the representation of the path associated with the boot target comprises a binary representation of the plurality of nodes according a device path structure.

20. The method of claim 18, wherein initializing the plurality of nodes included in the path based on the representation of the path included in the hand-off-block concurrently with a second plurality of nodes included in a second path associated with a second boot target comprises executing initialization code for the plurality of nodes included in the path concurrently with initialization code for the second plurality of nodes in the second path.

21. The system of claim 18, wherein the first phase of initialization includes a pre-Extensible-Firmware-Interface (PEFI) phase and the second phase of initialization includes a Driver Execution Environment (DXE) phase.

22. The system of claim 21, wherein the plurality of nodes included in the path and second plurality of nodes included in the second path, each include nodes individually selected from a group consisting of a hardware device path node, an ACPI device path node, a messaging device path node, a media device path node, a BIOS boot specification device path node, and an end of hardware device path node.

* * * * *